(12) United States Patent
Nakamura

(10) Patent No.: US 6,999,585 B2
(45) Date of Patent: Feb. 14, 2006

(54) FOLDING TYPE PORTABLE COMMUNICATION DEVICE

(75) Inventor: Futoshi Nakamura, Saitama (JP)

(73) Assignee: NEC Corporation, Tokyo (JP)

(*) Notice: Subject to any disclaimer, the term of this patent is extended or adjusted under 35 U.S.C. 154(b) by 446 days.

(21) Appl. No.: 09/874,064

(22) Filed: Jun. 6, 2001

(65) Prior Publication Data

US 2002/0009192 A1 Jan. 24, 2002

(30) Foreign Application Priority Data

Jun. 7, 2000 (JP) .............................. 2000-171174

(51) Int. Cl.
*H04M 1/00* (2006.01)
(52) U.S. Cl. .................... 379/433.01; 379/374.02; 379/374.03; 455/575.1; 455/575.3
(58) Field of Classification Search .......... 379/374.03, 379/374.02, 433.01, 373.01, 373.02, 433.05, 379/433.06, 433.11, 433.13; 455/575.3, 455/567, 575.1
See application file for complete search history.

(56) References Cited

U.S. PATENT DOCUMENTS

| | | | | |
|---|---|---|---|---|
| 5,764,751 A | * | 6/1998 | Konishi | 379/373.02 |
| 5,896,096 A | * | 4/1999 | Kim | 340/7.24 |
| 6,115,620 A | * | 9/2000 | Colonna et al. | 455/569.1 |
| 6,188,916 B1 | * | 2/2001 | Noda et al. | 455/567 |

FOREIGN PATENT DOCUMENTS

| | | |
|---|---|---|
| EP | 0 607 038 | 7/1994 |
| GB | 2297661 A | 8/1996 |
| GB | 2339648 * | 2/2000 |
| JP | 8-126061 | 5/1996 |
| JP | 11-205857 | 7/1996 |
| JP | 10-308980 | 11/1998 |
| JP | 11-308669 | 11/1999 |
| JP | 2000-83282 | 3/2000 |

OTHER PUBLICATIONS

European Patent Office Search Report for corresponding application.

* cited by examiner

*Primary Examiner*—Bing Q. Bui
(74) *Attorney, Agent, or Firm*—Whitham, Curtis & Christofferson, P.C.

(57) ABSTRACT

The present invention is intended to simplify operation of a folding type portable communication device 1 in making a switch or selection between a call reception vibration mode and a call reception sound mode. The device 1 has two communication units 2 and 3. A two-level switch 4 can detect an unfolded position or a folded position of the communication units 2 and 3, causing a mode selector 5 to select a call reception vibration mode or a call reception sound mode. The mode selector 5 has a first circuit 14 for driving a vibrator 6 and a second circuit 15 for driving a sounder 7. The mode selector 5 has a controller 16. The controller 16 energizes one of the first and second circuits 14 and 15 in response to the selected mode upon reception of a call.

7 Claims, 4 Drawing Sheets

FOLDING TYPE PORTABLE COMMUNICATION DEVICE

BACKGROUND OF THE INVENTION

1. Field of the Invention

The present invention relates to a folding type portable communication device.

2. Description of the Related Art

Recent liberation in telecommunication world has accelerated wide distribution among the mass of people of various mobile communication media including portable communication devices.

A representative one of such portable communication devices has a transmitter section and a receiver section. The transmitter section includes a key pad and a microphone. The receiver section includes a speaker and a display. The receiver section is equipped with an antenna.

In such portable communication devices, a need remains toward miniaturization for convenience to carry as well as a need for a large display and a large key pad. To comply with these needs, folding type portable communication devices are now in wide use. They have two foldable housings, one having a wide display, the other having a wide key pad.

The two housings are connected via hinge. It is folded to conceal the display and key pad, and unfolded to expose them for the operator use.

JP-A 11-308669 discloses a method and system for notifying an operator of a foldable type portable communication device of reception of a calling when it is folded and not in use. The device has a vibrator to be used in a calling reception vibration mode and a sounder to be used in a calling reception sound mode. There is no disclosure as to a switch between the two modes.

As far as known to the inventors, an operator must unfold a folding type communication device to manipulate a key pad or key to make a switch between the two modes. In other words, the operator cannot select a desired one of the two modes when it is folded.

An object of the present invention is to provide a folding type portable communication device that is easy to operate in selecting a desired one of calling reception modes.

SUMMARY OF THE INVENTION

According to one exemplary implementation of the invention, there is provided a folding type portable communication device, comprising;

two communication units connected to each other in a foldable manner and having a folded position and an unfolded position;

a two-level switch for detecting which one of the folded and unfolded position the two communication units have, the switch providing a first level when the two communication units have the folded position and a second level when the two communication units have the unfolded position;

a vibrator;

a sounder;

a mode selector operatively coupled with the two level switch, the vibrator and the sounder for selectively providing setting for one of a call reception vibration mode and a call reception sound mode in response to the level provided by the two-level switch, the mode selector including a first circuit for driving the vibrator when energized and a second circuit for driving the sounder when energized, the mode selector including a controller for energizing the first circuit upon reception of a call when the setting for the call reception vibration mode is provided and the second circuit upon reception of a call when the setting for the call reception sound mode is provided.

BRIEF DESCRIPTION OF THE DRAWINGS

The foregoing and other objects, features and advantages of the invention will be apparent from the following more particular description of an exemplary embodiment of the invention as illustrated in the accompanying drawings. The drawings are not necessarily scale, emphasis instead being placed upon illustrating the principles of the invention.

DESCRIPTION OF THE PREFERRED EMBODIMENT

Figure 1:
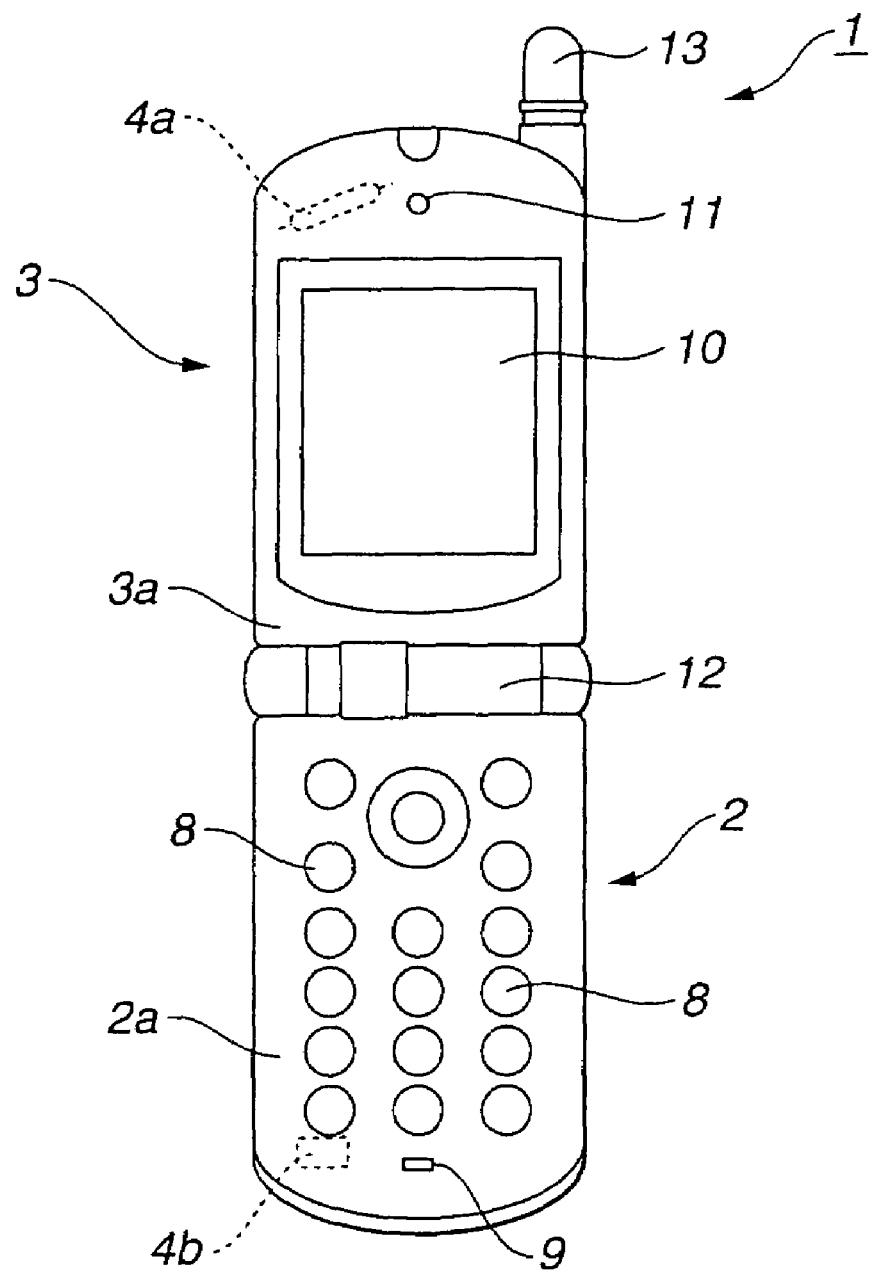
FIG. 1 is a plan view of a folding type portable communication device in an unfolded position according to the present invention.
Figure 2:
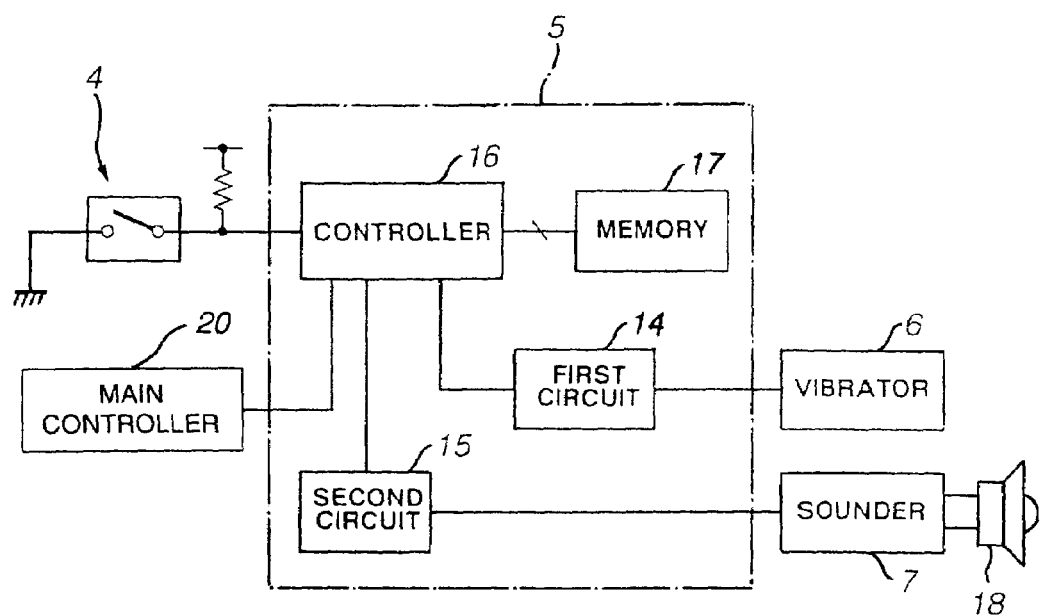
FIG. 2 is a block diagram of a mode selector with a two-level switch, a vibrator and a sounder.
Figure 3:
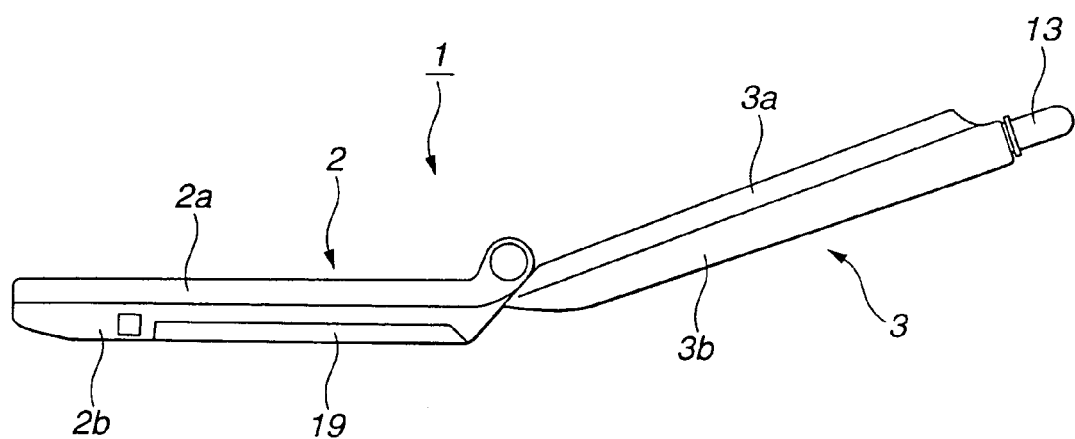
FIG. 3 is a side view of the folding type portable communication device in the unfolded position.
Figure 4:
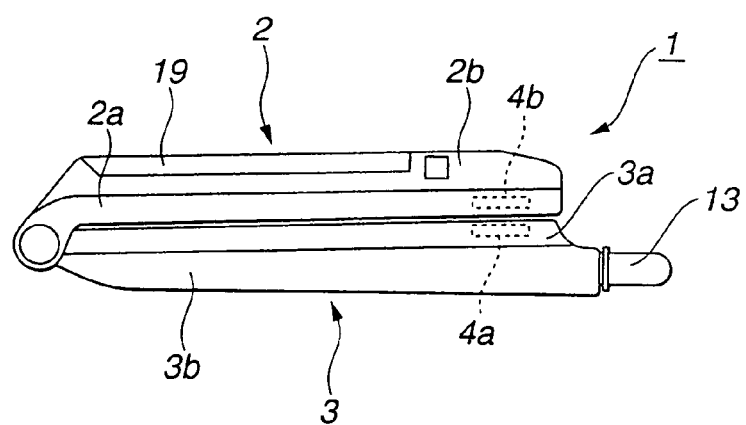
FIG. 4 is a side view of the folding type portable communication device in a folded position.
Figure 5:
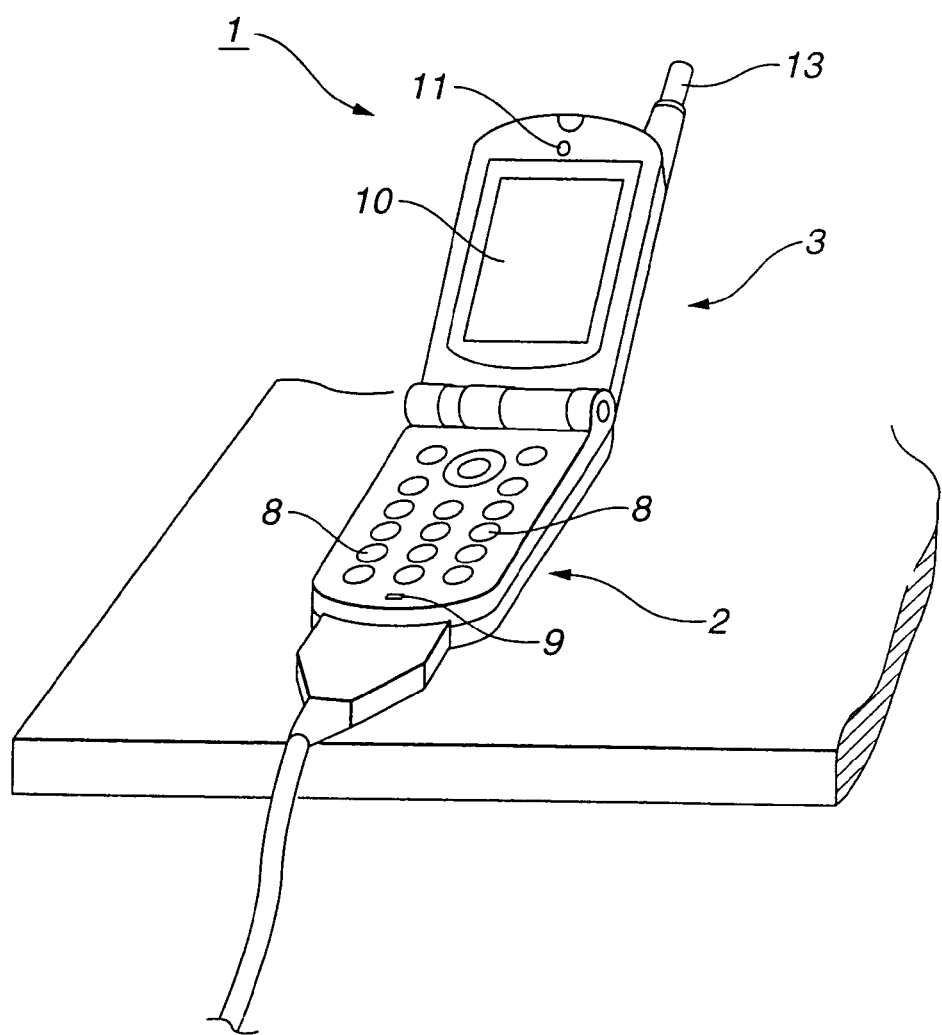
FIG. 5 is a perspective view of the folding type portable communication device in the unfolded position placed on a desk and coupled with a battery charger.

Referring to FIGS. 1 to 5 of the accompanying drawings, the reference numeral 1 designates a folding type portable communication device according to the present invention. This device 1 comprises two communication units, namely, a first communication unit 2 and a second communication unit 3. The communication units 2 and 3 are connected to each other in a foldable manner for pivotal movement between a folded position as illustrated in FIG. 4 and an unfolded position as illustrated in FIG. 3. The communication device 1 also comprises a two-level switch 4, a mode selector 5, a vibrator 6, and a sounder 7.

The first communication unit 2 has a key pad 8 and a microphone 9. In the embodiment, the first communication unit 2 is a rectangular plastic box resulting from assembling a lid 2a and a housing 2b by means of fasteners, not shown.

The second communication unit 3 has a display 10 and a speaker 11. In the embodiment, the second communication unit 3 is a rectangular plastic box resulting from assembling a lid 3a and a housing 3b by means of fasteners, not shown. The first and second communication units 2 and 3 are connected to each other by a hinge 12. An antenna 13 is attached to the second communication unit 3 and extends in a direction orthogonal to an axis of the hinge 12.

The two-level switch 4 has a first level and a second level. In the embodiment, the two-level switch 4 has an ON level and an OFF level, and includes a magnet 4b mounted within the first communication unit 2 and a detector 4a mounted within the second communication unit 3 for detecting a magnetic field provided by the magnet 4b. In another embodiment, the magnet 4b may be mounted within the second communication unit 3 and the detector 4a within the first communication unit 2. The two-level switch 4 assumes the first or ON level when the communication units 2 and 3 are folded or closed as illustrated in FIG. 4. It assumes the second or OFF level when the communication units 2 and 3 are unfolded or opened as illustrated in FIG. 3.

In the embodiment, the two-level switch 4 assumes ON level when the detector 4a detects the magnetic field Of the magnet 4b, and OFF level when the detector 4a fails to detect the magnetic filed of the magnet 4b.

In the embodiment, the detector 4a, which includes a Hall effect element, is embedded within the second communication unit 3 and located in the neighborhood of the speaker 11. The magnet 4b is embedded within the first communication unit 2 and arranged to come into registry with the detector 4a when the communication units 2 and 3 are folded.

The mode selector 5 is operatively coupled with the two-level switch 4 and mounted within the second communication unit 3 that has the detector 4a. The mode selector 5 provides setting for one of a call reception vibration mode and a call reception sound mode in response to the level provided by the two-level switch 4. The mode selector 5 includes a first circuit 14 for driving the vibrator 6 when energized. The mode selector 5 includes a controller 16, in the form of a large scale integrated (LSI) circuit, for energizing the first circuit 14 upon reception of a call when the setting for the call reception vibration mode is provided and the second circuit 15 upon reception of a call when the setting for the call reception sound mode is provided.

With reference to FIG. 2, the first circuit 14 is a vibrator driver circuit. When energized by a control signal from the controller 16, the first circuit 14 drives the vibrator 6. The vibrator 6 is connected to the first circuit 14.

The second circuit 15 is a sounder driver circuit. When energized by a control signal from the controller 16, the second circuit 15 drives the sounder 7. The sounder 7 is connected to the second circuit 15 and the speaker 18 to produce sound upon receiving a call.

The controller 16 is connected to a memory 17, a main controller 20, and the two-level switch 4. The memory 17 stores settings for call reception vibration mode and call reception sound mode. When a call reception signal is received from the main controller 20, the controller 16 energizes the first circuit 14 when the setting for vibration mode is provided, and the second circuit 15 when the setting for sound mode is provided.

The communication device 1 has a battery case 19 for a battery, not shown.

With the communication units 2 and 3 unfolded, the controller 16 causes the sounder 7 to produce sound upon receiving a call. With the communication units 2 and 3 folded, the controller 16 causes the vibrator 6 to produce vibration upon receiving a call.

Explaining in more detail, when the communication units 2 and 3 are unfolded as illustrated in FIG. 3, the two-level switch 4 is at OFF level, causing the controller 16 to provide setting for a call reception sound mode (ON setting) and cancel setting for a call reception vibration mode (OFF setting). Under this condition, upon receiving a call, the controller 16 energizes the second circuit 15, causing the sounder 7 to produce sound. When the communication units 2 and 3 are folded as illustrated in FIG. 4, the two-level switch 4 is at ON level, causing the controller 16 to cancel setting for call reception sound mode (OFF setting) and provide setting for call reception vibration mode (ON setting). Under this condition, upon receiving a call, the controller 16 energizes the first circuit 14, causing the vibrator 6 to produce vibration. The relationships mentioned above are tabulated as follows:

| COMMUNICATION DEVICE | SWITCH | SOUND MODE | VIBRATION MODE |
|---|---|---|---|
| UNFOLDED | OFF | ON setting | OFF setting |
| FOLDED | ON | OFF setting | ON setting |

From the preceding description, it is now appreciated that, in the embodiment, folding the communication units 2 and 3 provides setting for vibration mode, and unfolding the communication units 2 and 3 provides setting for sound mode. The present invention is not limited to this embodiment. In another embodiment according to the present invention, folding the communication units 2 and 3 may provide setting for sound mode and unfolding the communication units 2 and 3 may provide setting for vibration mode.

In the embodiment, the two-level switch 4 is at OFF level when the communication units 2 and 3 are unfolded, causing the sounder 7 to produce sound upon receiving a call. The two-level switch 4 is at ON level when the communication units 2 and 3 are folded, causing the vibrator 6 to produce vibration upon receiving a call. The present invention is not limited to this embodiment. In another embodiment according to the present invention, th two-level switch 4 may be at ON level when the communication units 2 and 3 are unfolded, causing the sounder 7 to produce sound upon receiving a call, and it may be at OFF level when the communication units 2 and 3 are folded, causing the vibrator 6 to produce vibration upon receiving a call.

In the embodiment, the magnet 4b is brought into registry with the detector 4a. The present invention is not limited to this arrangement. In other embodiment, the magnet 4b may be out of registry with the detector 4a as long as the detector 4a can detect the magnetic field of the magnet 4b when the communication units 2 and 3 are folded.

In the embodiment, the two-level switch 4 employs the magnet 4b and the detector 4a. The present invention is not limited to this type of switch. Two-level switches of any types may be used.

From the preceding description, it will now be appreciated that simple manipulation of unfolding or folding the communication units 2 and 3 can make a switch between sound mode and vibration mode, without any manipulation of key pad.

While the present invention has been particularly described, in conjunction with preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A folding type portable communication device, comprising:
   two communication units connected to each other in a foldable manner and having a folded position and an unfolded position;
   a two-level switch for detecting which one of the folded and unfolded position the two communication units have, the two-level switch providing a first level when the two communication units have the folded position and a second level when the two communication units have the unfolded position;

a main controller;
a vibrator;
a sounder;
a mode selector operatively coupled with the two-level switch, the vibrator and the sounder for selectively providing setting for one of a call reception vibration mode and a call reception sound mode in response to the level provided by the two-level switch,
the mode selector including a first circuit for driving the vibrator when energized and a second circuit for driving the sounder when energized;
the mode selector including a controller for energizing the first circuit upon reception of a call, as signaled by said main controller, when the setting for the call reception vibration mode is provided and the second circuit upon reception of a call when the setting for the call reception sound mode is provided.

2. A folding type portable communication device as claimed in claim 1, wherein the controller energizes the first circuit upon reception of a call when the two-level switch provides the first level indicating that the two communication units have the folded position, and where the controller energizes the second circuit upon reception of a call when the two-level switch provides the second level indicating that the two communication units have the unfolded position.

3. A folding type portable communication device as claimed in claim 1, wherein the controller energizes the first circuit upon reception of a call when the two-level switch provides the second level indicating that the two communication units have the unfolded position, and where the controller energizes the second circuit upon reception of a call when the two-level switch provides the first level indicating that the two communication units have the folded position.

4. A folding type portable communication device as claimed in claim 1, wherein the mode selector includes a memory coupled with the controller, and wherein the memory stores the settings for the call reception vibration mode and call reception sound mode.

5. A folding type portable communication device as claimed in claim 1, wherein the two-level switch includes a magnet mounted within one of the two communication units and a detector mounted within the other communication unit for detecting a magnetic field provided by the magnet.

6. A folding type portable communication device as claimed in claim 5, wherein the magnet is brought into registry with the detector when the two communication units have the folded position.

7. A method of controlling a selection between a call reception vibration mode and a call reception sound mode of a folding type portable communication device that has two communication units connected to each other in a foldable manner and having a folded position and an unfolded position, said folding type communication device having a main controller and a mode selector including a controller, the method comprising;
detecting which one of the folded and unfolded position the two communication units have;
providing setting for the call reception vibration mode upon detecting the folded position; and
providing setting for the call reception sound mode upon detecting the unfolded position, and
wherein the position of folded or unfolded is determined by a two-level switch connected directly to a controller; and
wherein a main controller, connected to said controller, receives the call reception signal.

* * * * *